United States Patent [19]

Geyer

[11] Patent Number: 5,699,698
[45] Date of Patent: Dec. 23, 1997

[54] SYSTEM FOR EXTENDING OR RETRACTING TWO MEMBERS AND CAM-LOCKING THE MEMBERS IN THE EXTENDED POSITION

[75] Inventor: Freddy Geyer, Tanneron, France

[73] Assignee: Aerospatiale Societe Nationale Industrielle, Paris, France

[21] Appl. No.: 605,061

[22] PCT Filed: Jul. 19, 1995

[86] PCT No.: PCT/FR95/00967

§ 371 Date: Mar. 5, 1996

§ 102(e) Date: Mar. 5, 1996

[87] PCT Pub. No.: WO96/02418

PCT Pub. Date: Feb. 1, 1996

[30] Foreign Application Priority Data

Jul. 20, 1994 [FR] France .................. 94 08966

[51] Int. Cl.⁶ .................................................. G05G 1/04
[52] U.S. Cl. .................. 74/526; 74/567; 403/320; 403/322
[58] Field of Search ............... 74/526, 527, 567; 403/322, 326, 327, 320; 16/325, 324; 24/498

[56] References Cited

U.S. PATENT DOCUMENTS

| 736,053 | 8/1903 | Armstrong | 292/257 X |
|---|---|---|---|
| 945,081 | 1/1910 | Burt | 24/498 X |
| 1,511,704 | 10/1924 | Buck | 24/498 X |
| 2,060,214 | 11/1936 | Hitchens | 24/498 X |
| 2,143,575 | 1/1939 | Raymond | 292/223 |
| 3,565,448 | 2/1971 | Angelbeck | 24/498 X |
| 3,643,292 | 2/1972 | Mayer | 16/325 |
| 3,745,853 | 7/1973 | Deibel et al. | 74/586 |
| 4,274,666 | 6/1981 | Peck | 292/257 |
| 4,431,333 | 2/1984 | Chandler | 403/322 |
| 4,747,566 | 5/1988 | Kiendl | 244/173 |
| 4,880,188 | 11/1989 | Roth et al. | 244/173 |
| 5,108,216 | 4/1992 | Geyer et al. | 403/330 |
| 5,393,018 | 2/1995 | Roth et al. | 244/173 |
| 5,570,488 | 11/1996 | Deng | 15/250.16 |

FOREIGN PATENT DOCUMENTS

| 0 418 131 A1 | 3/1991 | European Pat. Off. . |
| 2627150 | 8/1989 | France . |
| 4 032 112 A1 | 4/1992 | Germany . |
| 4 336 044 A1 | 4/1994 | Germany . |
| 4 337 968 A1 | 5/1994 | Germany . |

*Primary Examiner*—Vinh T. Luong
*Attorney, Agent, or Firm*—Fisher, Christen & Sabol

[57] ABSTRACT

A system for extending or retracting two rotationally interconnected members and locking or releasing the members in the extended position. The system includes a locking cam (4) on a shaft (5) combined with the first member (2) and connected to a drive (9). The cam is engageable with a bearing surface (8) on the second member. The drive (9) is preferably a power drive rotating the two members about their pivot axis and includes a motor (9A) with a rotational axis (17) parallel to the rotational axes (10, 11) of the cam and the shaft, the rotational axis coinciding with the pivot axis of the two members; a transmission (18) linking the motor to the shaft; and a radial linkage (19) rotating with the motor and capable of rotating the second member about the pivot axis.

9 Claims, 6 Drawing Sheets

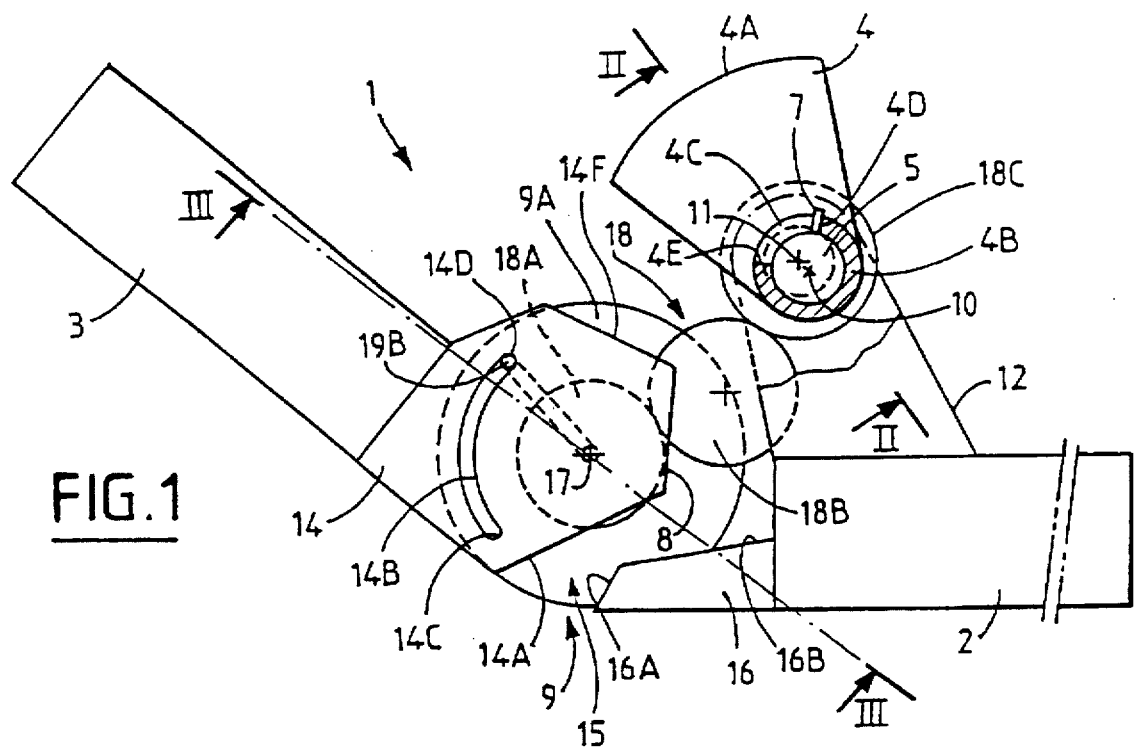
FIG.1
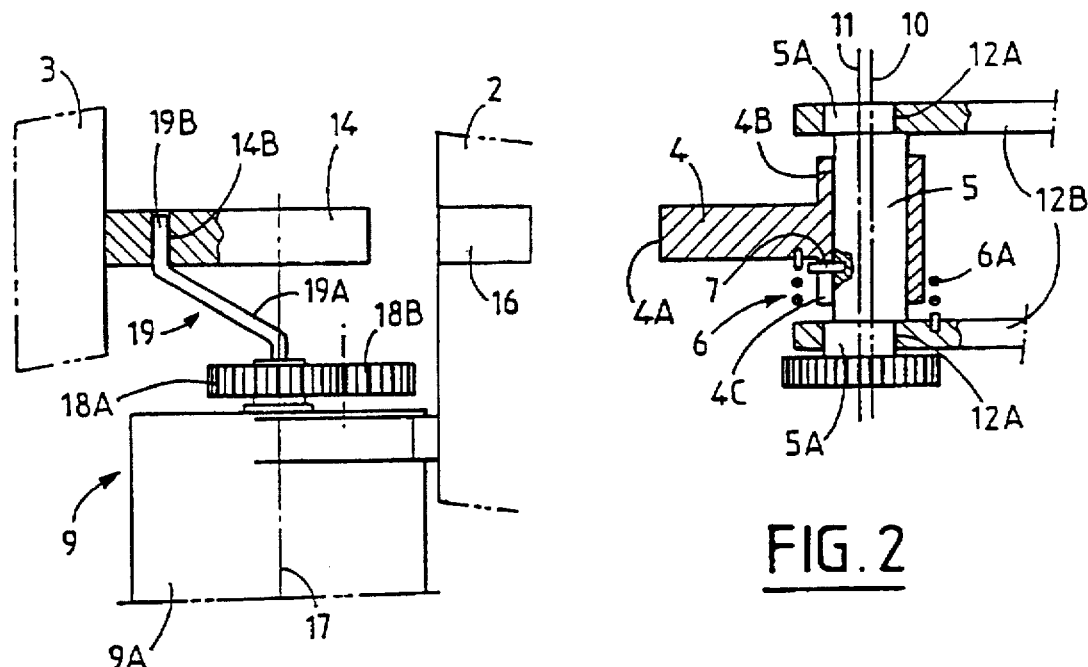
FIG.3
FIG.2

FIG. IA

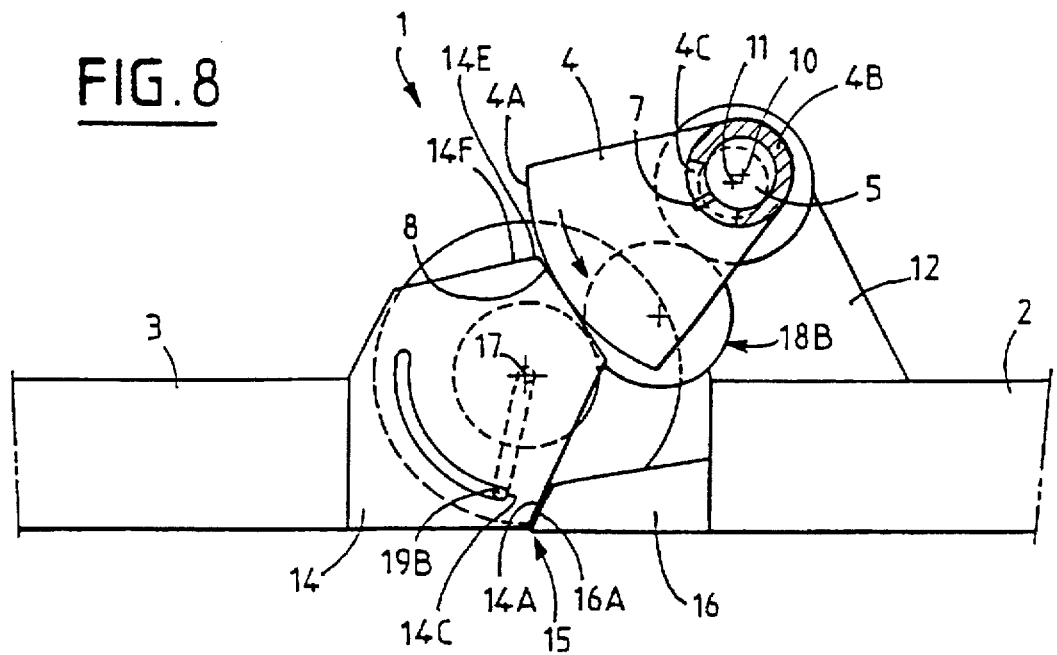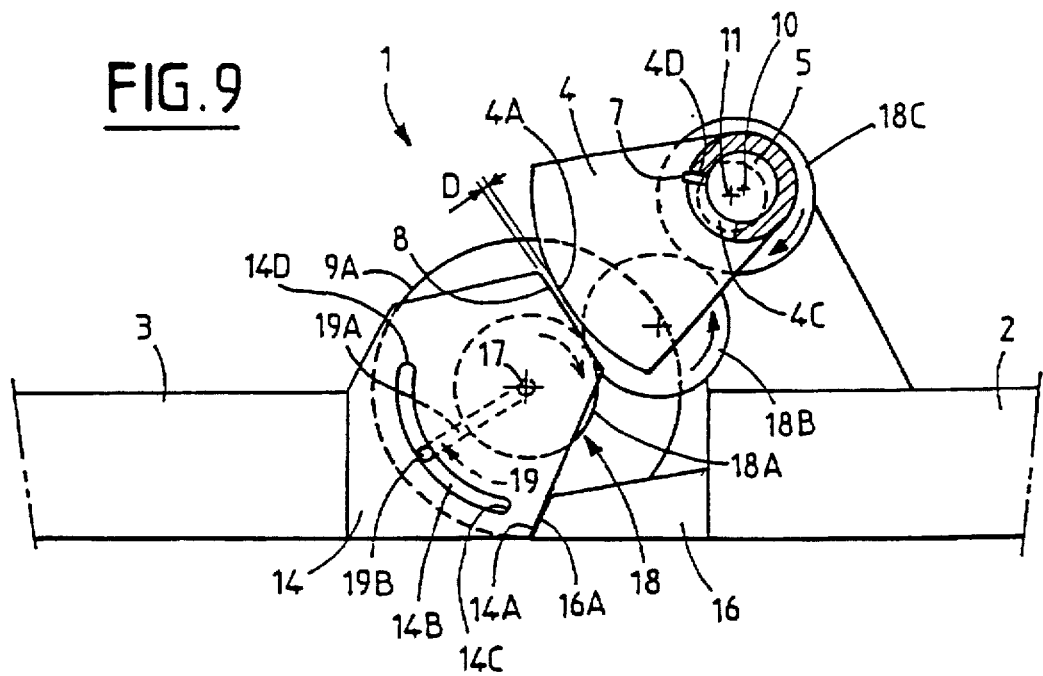

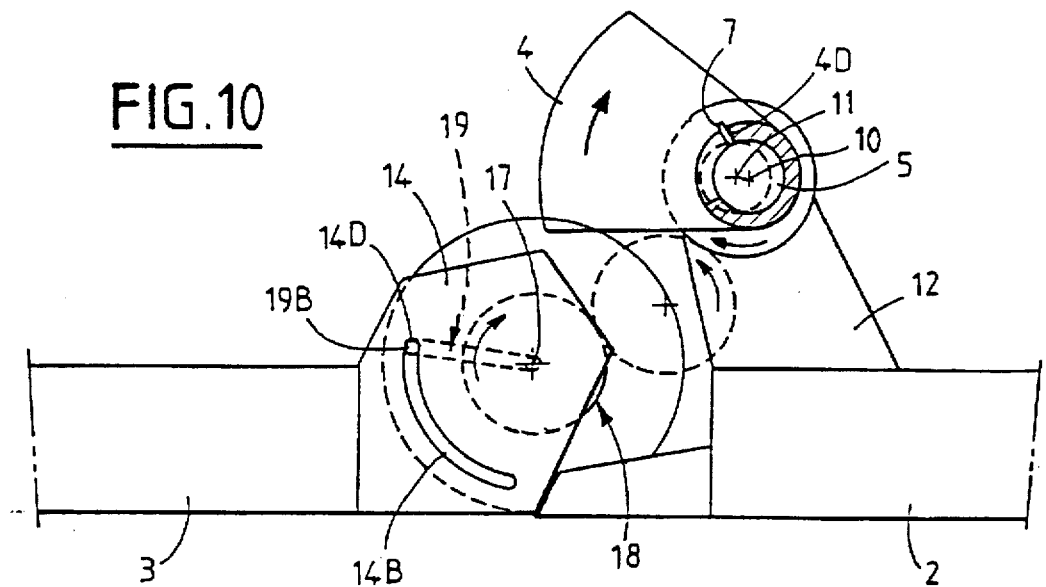
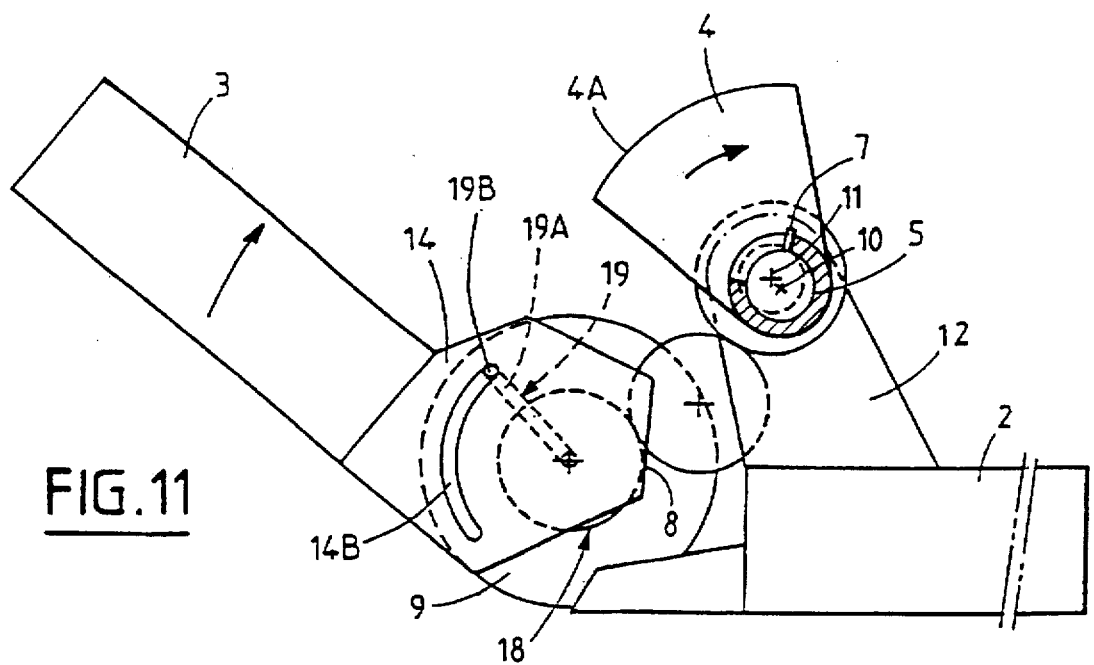

SYSTEM FOR EXTENDING OR RETRACTING TWO MEMBERS AND CAM-LOCKING THE MEMBERS IN THE EXTENDED POSITION

FIELD OF THE INVENTION

The present invention relates to a system for unfolding or folding up two elements which are linked in terms of rotation, as well as for locking or unlocking of the said elements when they occupy at least the unfolded position.

More specifically, the system is especially applicable to the field of space to allow the unfolding or the folding-up of elements or of structures such as parabolic antennae, active planar antennae, radar antennae, solar panels, deployment masts and the like, relative to space stations or platforms, shuttles, artificial satellites, and also to provide the functions of locking/unlocking the said elements in the unfolded position. Quite clearly the system could find applications in other technical fields, in which the rotation and the locking in a given position of two elements one with respect to the other are to be achieved reliably and robustly.

BACKGROUND OF THE INVENTION

It is known that the unfolding of large elements, such as those listed hereinabove, requires, particularly in the field of space, the production of systems which, in addition to remarkable reliability, guarantee a complete absence of play between the various components forming the system and the elements, and a high degree of rigidity, without fail, when the said elements occupy their unfolded, locked, position. To achieve this, a vigorous locking system meeting these requirements consists in using a cam with a logarithmic profile which is mounted on a rotary shaft linked to one of the elements and which makes it possible to obtain an increasing locking force against a bearing face, provided in a corresponding position on the other element. Nevertheless, the drawback of such a locking system is that it exhibits almost complete irreversibility, which prevents the unfolded element from being folded up, if necessary. Indeed, under the action of vibration, differential expansion due to the effect of temperature gradients, etc., the cam with logarithmic profile tends spontaneously to become engaged to an increasing extent against the bearing face, thus causing increasingly vigorous locking.

Hence, to overcome this drawback and continue to use a cam with a logarithmic profile for the advantages which it affords, the system has been improved particularly by mounting the cam in an offset fashion on the shaft, as taught by French patent 2, 651, 843 or U.S. Pat. No. 5,108,216 of the Applicant Company.

The locking system described therein discloses in particular that:

the said cam can turn about a shaft on the axis of which the origin of the said logarithmic spiral is located, the said shaft being mounted so that it can rotate on the said first element about an axis of rotation which is offset in the opposite direction to the said contact surface of the said cam, with respect to the axis of the said shaft;

elastic means are provided to cause the said cam to turn in a first direction such that the said contact surface moves towards the said bearing face;

the said shaft bears a stub which is integral therewith in terms of rotation and which can drive the said cam in rotation in a second direction, opposite to the first, the said stub not preventing the said cam from rotating in the said first direction under the action of the said elastic means; and manual means are provided so as to be able to make the said shaft turn about the said offset axis of rotation, in the said second direction.

Hence, by offsetting the axes of the cam and of the shaft and through the manual means for rotating the said shaft, it is possible, when the means are actuated following an intervention from outside the vehicle, to get the logarithmic surface of the cam to move away from the said flat bearing face, which in succession allows the second element in the unfolded position to be unlocked from the first element bearing the cam, then to return the second element towards the folded-up position against the first by pivoting about an axis of articulation linking them.

Although this locking system avoids the jamming effect of the cam, it is still no less restrictive in so far as it requires a manual intervention to unlock the cam, then another subsequent intervention to fold up the unfolded element towards the folded-up position.

SUMMARY OF THE INVENTION

The object of the present invention is to overcome these drawbacks.

To this end, the system for unfolding or folding up two elements which are linked in rotation and for locking or unlocking the said elements at least in the unfolded position, of the type including:

a cam, provided on the first of the elements and having a contact surface in the shape of logarithmic spiral;

a flat bearing face provided on the second of the elements and against which the contact surface of the said cam can press;

a shaft, on which the said cam can turn about a first axis containing the origin of the spiral, and which shaft is mounted so that it can rotate on the said first element about a second axis which is offset parallel to the first axis of rotation of the said cam;

elastic means tending to make the said cam turn in a first direction such that its contact surface moves towards the said bearing face;

a finger, integral in terms of rotation with the said shaft and capable of driving the said cam in a second direction, opposite to the first; and means for driving the said shaft in rotation, is noteworthy, according to the invention, in that the said drive means are motorized and also drive the rotation of the two elements one with respect to the other about the axis about which they are articulated, and in that the said means comprise:

a motor, the axis of rotation of which is parallel to the axes of rotation of the cam and of the said shaft, and corresponds to the axis about which the two elements are articulated;

a transmission linking the said motor to the said shaft; and a radial link, integral in terms of rotation with the said motor and able to drive the said second element in rotation about the said axis of articulation.

Hence, by virtue of the invention, the drive means form a motorized articulation between the two elements, which makes it possible to ensure automatically and simultaneously the unfolding/folding-up of the said elements and their locking/unlocking in the unfolded position, in a motorized fashion by means of the radial link and of the transmission, both these being linked to the said motor and respectively commanding the unfolding/folding-up of the elements and the locking/unlocking thereof.

In a preferred embodiment, the said transmission linking the said motor to the said shaft is composed of a plurality of coplanar gearwheels, a gearwheel integral in terms of rotation with the said motor, a gearwheel integral with the said shaft and an intermediate gearwheel linking the respective gearwheels of the motor and of the shaft so that the direction of rotation of the second element and of the cam, linked to the shaft, is identical.

For example, the said motor and the said intermediate gearwheel are linked to the said first element.

As far as the said radial link linking the said motor to the said second element is concerned, it may be defined by a radial arm integral with the said motor and the free end of which engages in a curved slot formed in the said second element and the centre of which is the axis of rotation of the said motor. The said curved slot of the said second element in particular covers an angle of approximately 90°.

Moreover, the said finger, integral in terms of rotation with the said shaft, advantageously projects from the latter into a curved slot formed in the said cam. Also, the said elastic means preferably consist of a prestressed torsion spring mounted around the said shaft and respectively linked to the said cam and to the said first element.

According to another feature of the said system, stop means provided to mark the respective unfolded and folded-up positions of the said second element with respect to the first. For example, the said stop means are defined by contact faces provided on the said mobile second element, and able to press against corresponding faces provided on the said stationary first element.

The figures of the appended drawing will make it easy to understand how the invention may be embodied. In these figures, identical references denote similar elements.

BRIEF DESCRIPTION OF THE DRAWINGS

FIG. 1A is a schematic diagram showing the logarithmic spiral contact surface of the cam of the present invention.

FIG. 1 represents a partially sectioned diagrammatic embodiment of the said system in accordance with the invention.

FIGS. 2 and 3 are sectional views of the said system, the sections being taken respectively along the lines II—II and III—III of FIG. 1.

FIGS. 4 to 8 show the various operating phases of the said system, from the folded-up, unlocked, position of the said elements as far as their unfolded, locked, position and FIGS. 9 to 11 show the operating phases of the said system from the unfolded, unlocked position of the said elements towards their folded-up, unlocked position.

DETAILED DESCRIPTION OF THE INVENTION

In FIG. 1A a cam 4 is shown which is able to rotate about a first geometric axis 10. As shown in FIG. 1 and 1A, the cam 4 has the shape of an angular sector defining a contact surface 4A which, as shown in FIG. 1A, is shaped as a logarithmic spiral S whose origin is located on first geometric axis 10.

Figure 3:
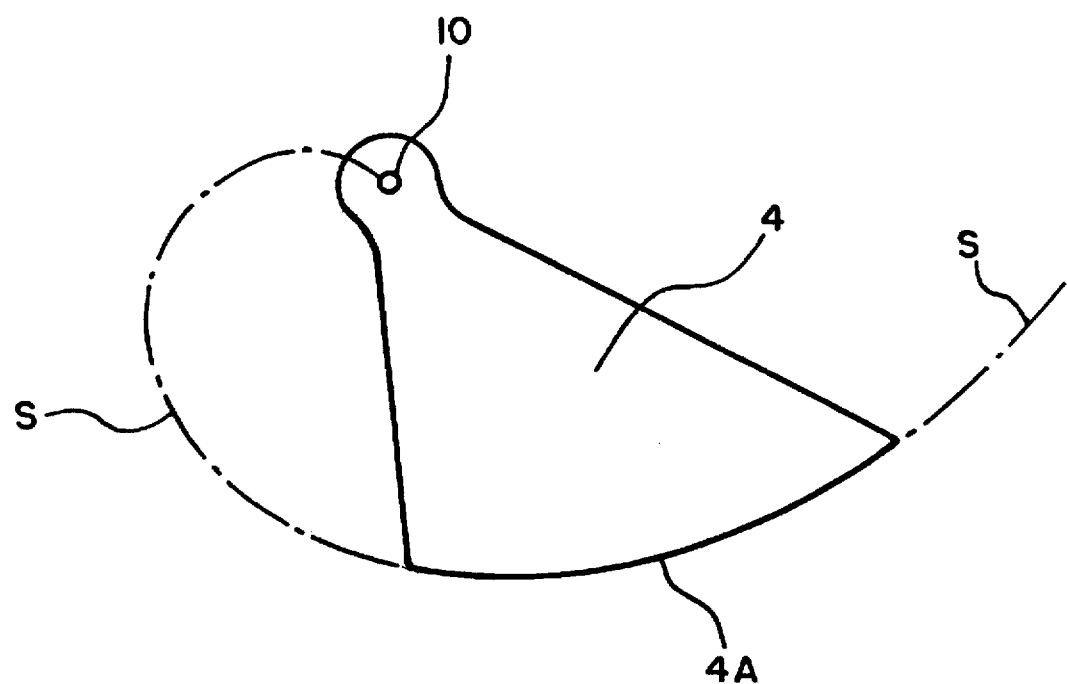

As FIGS. 1 to 3 show, the system 1 is intended to allow the unfolding and folding-up of two elements 2, 3 relatively moveable in terms of rotation one with respect to the other, and the locking and unlocking of the two elements when they occupy the unfolded position. Depending on the type of elements present, indicated earlier, and on their dimensions and mass, it is possible to envisage one or more systems I arranged coaxially between the two elements to rotate them from a folded-up or stacked position towards the unfolded position, and vice versa, and to lock/unlock them in the unfolded position.

In this embodiment, the system 1 mainly includes a cam 4, a shaft 5, elastic means 6 and a finger 7 which are linked to the first two of the said elements, a bearing face 8 provided on the second three of the elements, and rotary means 9. More specifically, the cam 4, as FIG. 1 shows, has the shape of an angular sector defining a contact surface 4A which is shaped as logarithmic spiral and which is intended to provide locking by contacting the bearing face 8. The features and advantages afforded by this type of logarithmic spiral-shaped profile are explained in detail particularly in French patent 2, 651, 843 or U.S. Pat. No. 5,108,216 of the Applicant Company and will therefore not be recalled fully here. This cam 4 is mounted so that it can rotate freely via a cylindrical bushing 4B on the shaft 5, about a first geometric axis 10, whereas this same shaft 5 can turn about a second geometric axis 11 with respect to a clevis 12 integral with the first element, the said second axis 11 being offset parallel to the said first axis 10. For that, the shaft 5 is borne by its ends in the form of journals 5A centred on the second axis 11, in bearing blocks 12A provided in the parallel cheeks 12B of the clevis 12, as FIG. 2 shows. The elastic means 6 are produced in the form of a prestressed torsion spring 6A and tend to make the cam 4 pivot in a first direction of rotation, so that its contact surface 4A moves towards the bearing face 8 of the second element. In particular, the spring is mounted around the cam and engages, on the one hand, on this cam and, on the other hand, on the corresponding cheek of the clevis so that under the action of the prestressed spring 6A, the cam 4 tends to turn about the first geometric axis 10 of the shaft 5.

The finger 7 is integral in terms of rotation with the shaft 5 and it projects radially outwards therefrom. It can be seen in FIGS. 1 and 2 that it thus emerges into a curved slot 4C formed in the cylindrical bushing 4B of the cam, so as to be able to drive the cam in rotation in a second direction of rotation, opposite to the first, while preventing the cam from rotating in the first direction under the action of the spring, by virtue of the curved slot, as will be seen later.

As far as the bearing face 8 is concerned, it is flat and straight and finishes off a fitting 14 which is integral with the element 3 and which is arranged in the same plane as the plane of the cam 4, so that the contact surface 4A of the latter interfaces perfectly with the flat bearing face 8 of the fitting.

Moreover, to mark the unfolded and folded-up positions of the two elements 2 and 3, as will be seen later, for which positions these elements are respectively aligned or stacked, stop means 15 are provided. As far as the unfolded position is concerned, these means consist of a contact face 16A finishing off a tab 16 integral with the first element 2, and of a contact face 14A contiguous with the bearing face 8 of the fitting 14 of the said second element 3. As far as the folded-up position is concerned, the stop means are formed by another contact face 16B of the tab 16 and by a face 14F, opposite the face 14A with respect to the bearing face 8.

As for the rotary means 9, they are advantageously of the motorized type and defined by an electric motor 9A which allows the rotational drive, on the one hand, of the two elements 2 and 3 one with respect to the other about an axis 17 parallel to the axes 10 and 11 and, on the other hand, of the shaft 5 bearing the locking cam 8. In this embodiment, the axis of rotation 17 of the motor corresponds to the axis about which the two elements are articulated. The motor 9A of the said means is then linked to the shaft 5 by a transmission 18 which is composed of a driving gearwheel 18A coupled at the output of the motor, of an intermediate gearwheel 18B and of a gearwheel 18C integral with the shaft 5 at one of its ends 5A. By means of these three coplanar gearwheels, the rotation of the element 3 in one direction with respect to the element 2 leads to the rotation of the shaft 5 and hence of the cam 4 in the same direction. The motor 9A is for example fixed to the element 2 and the intermediate gearwheel 18B is borne, by a clevis which has not been represented, also by the element 2.

A radial link 19 moves the second element 3 in rotation with respect to the motor 9A, and therefore a radial arm 19A is integral with the axle of the motor and engages, via a finger 19B which finishes off its free end, in a curved slot 14B which is formed in the fitting 14 and which covers an angle of approximately 90° between its rounded ends 14C and 14D, with respect to the axis 17.

The operation of the system in accordance with the invention will be described below with reference to FIGS. 4 to 11.

Figure 4:
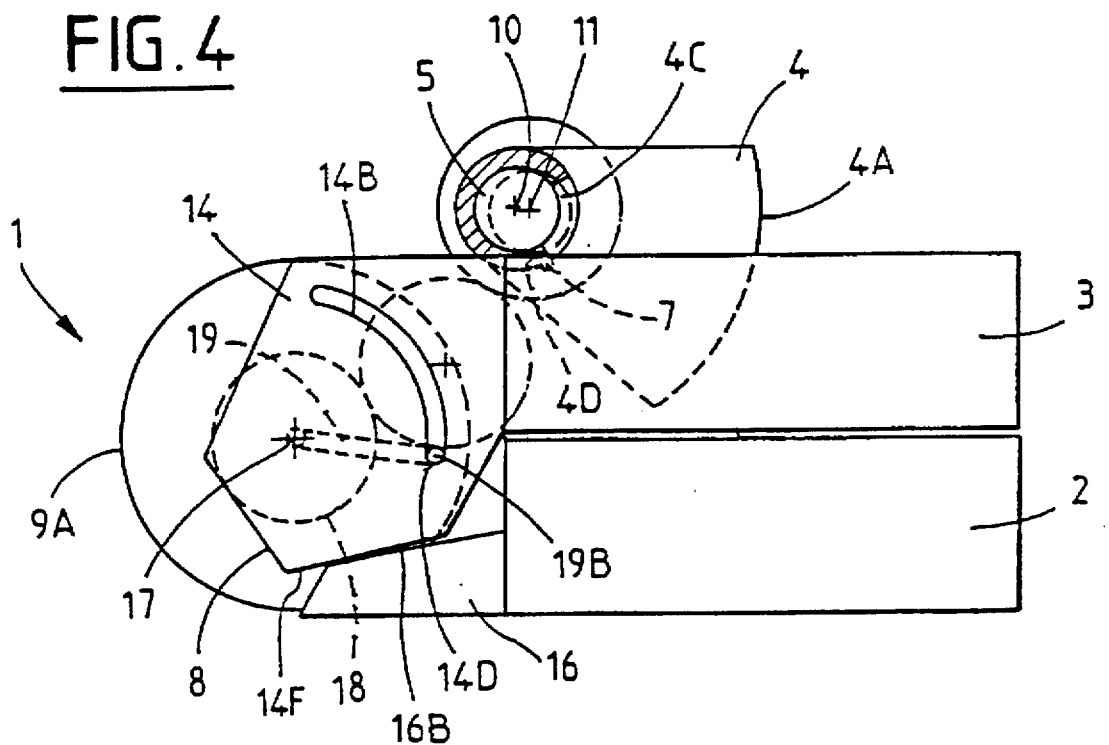

First of all, it is assumed that the said system 1 occupies the position illustrated in FIG. 4, for which the two elements 2 and 3, such as panels or the like, are folded up or stacked one against the other. The bearing face 14F of the fitting is situated against the bearing face 16B of the tab 16. The cam 4 is therefore retracted under the action of the driving finger 7 integral with the shaft 5 and cinematically linked to the axle 17 of the motor 9 via the transmission 18. The torsion or return spring 6A, which is tense, presses the end 4D of the slot 4C of the cam against the driving finger 7. As for the finger 19B of the radial arm 19A linking the motor 9A to the fitting 14 of the second element, it is in contact with the rounded end 14D of the curved slot 14B.

Figure 5:
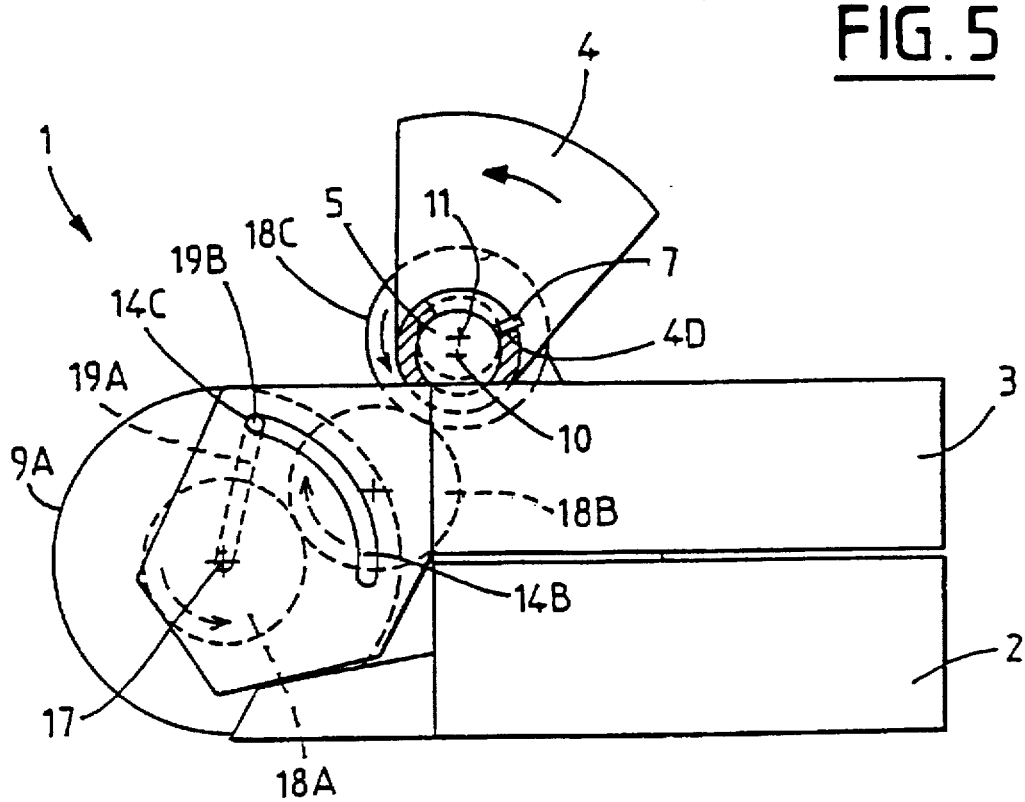

Next, the command for the system is given so as to bring about the unfolding and locking of the two elements in the unfolded position, as FIG. 5 shows. The rotation of the axle 17 of the motor 9A simultaneously causes, on the one hand, a rotation through 90° of the finger 19B in the slot 14B until it comes into contact with the other rounded end 14C thereof, the elements 2 and 3 thus remaining in the folded-up position and, on the other hand, an angularly identical rotation of the cam 4 via the transmission 18 (gearwheels 18A, 18B, 18C) and of the shaft 5, about the axis 11. The cam 4, under the action of the torsion spring 6A, remains in contact with the driving finger 7 via the end 4D of its slot 4C. This rotation of the motor, which has no effect on the rotation of the element 3 because of the slot 14B, already allows the cam 4, which was initially retracted, to be manipulated.

Figure 6:
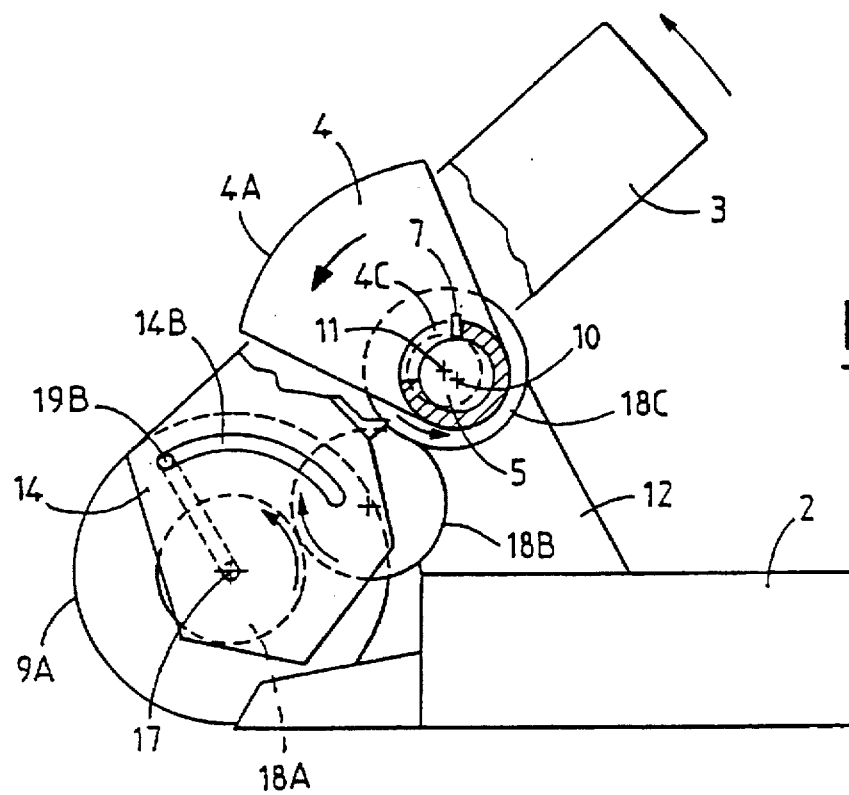

As FIG. 6 then shows, under the action of the finger 19B of the radial link 19, pressing against the rounded end 14C of the slot 14B, the second element 3 begins to rotate about the axis 17 and thus begins its passage towards the unfolded position. During this phase, the cam 4 remains in contact with the driving finger 7 through the action of the torsion spring 6A while turning about the axis 11 via the transmission and the shaft 5. The directions of rotation of the cam 4, of the element 3 and of the transmission 18 are indicated by arrows.

Figure 7:
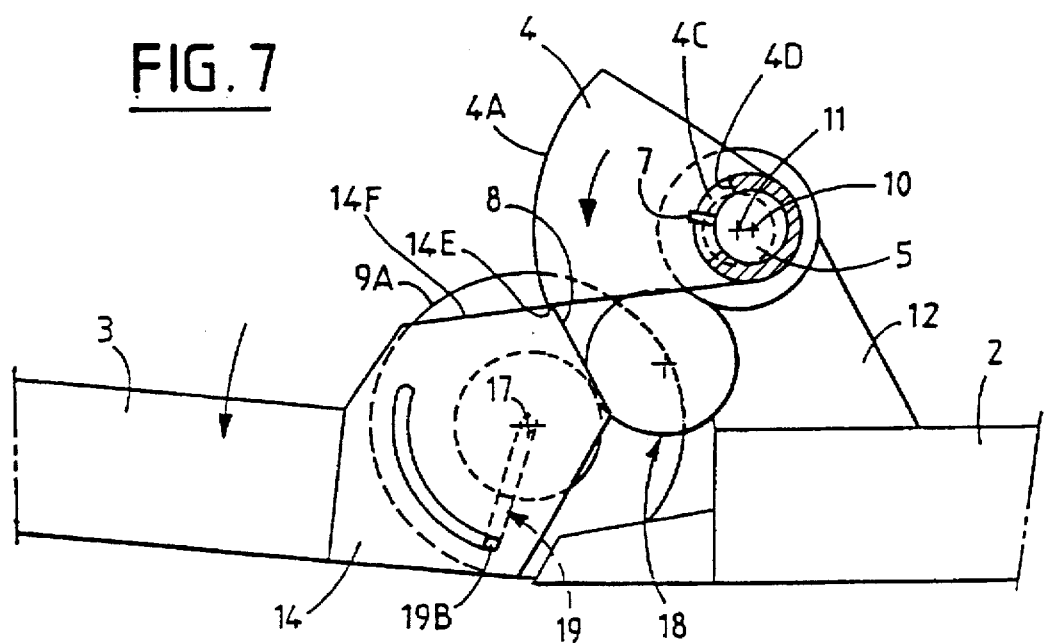

The rotational drive, under the action of the motor 9A, of the element 3 via the radial link 19, and of the shaft 5, via the transmission 18 continues, as FIG. 7 illustrates. The cam 4 then comes close to the fitting 14 and presses against a stop 14E provided on the latter and consisting of the edge of the contact face 14F, contiguous with the bearing face 8 and opposite the contact face 14A. The second element 3 is then almost aligned with the first element 2. The consequence of this cam 4/fitting 14 contact is to compress the torsion spring 6A of the cam 4, under the rotation of the shaft 5 which continues by virtue of the curved slot 4C formed in the cam. The finger 7 of the shaft then moves away from the end 4D of the slot 4C.

Thanks to the profile of the edge forming a stop 14E and following the rotation of the element 3, before the latter comes into the fully unfolded position, the contact surface 4A of the cam 4, turning about the first axis 10 under the action of its torsion spring 6A engages the bearing face 8 of the fitting. The rotational movement of the element 3 pushed by the finger 19B of the link 19 continues until the contact face 14A of the second element presses against the contact face 16A, forming a stop, of the first element, thus marking the unfolded and aligned position of the second element 3 with respect to the first element 2. At the same time as this phase ends, the bearing surface with logarithmic profile 4A of the cam presses against the bearing face 8, thus exerting, by virtue of its logarithmic profile, an increasing clamping force imparted by the driving energy of the torsion spring 6A. As FIG. 8 shows, vigorous locking of the element 3 in the unfolded position with respect to the element 2 is thus achieved while furthermore eliminating any dimensional play likely to arise between the various components forming the system 1, as a result of thermal expansion, vibration, etc.

It may be thus be observed in FIG. 8 that, in the unfolded and locked position of the said elements, the contact surface 4A of the cam presses on the bearing face 8 of the fitting, the stop faces 14A and 16A are in contact with each other, the finger 19B of the radial arm is in contact with the rounded end 14C of the curved slot 14A, and the driving finger 7 is located substantially in the middle of the slot 4C of the cam.

To pass, if necessary, from the unfolded and locked position of the elements 2, 3 towards the folded-up, unlocked, position, the motor 9A of the said means 9 is actuated in the opposite direction of rotation, as FIG. 9 shows. On the one hand, the finger 19B of the radial link 19, integral with the axle 17 of articulation of the motor, moves away from the rounded end 14C of the slot 14B, without acting on the element 3. On the other hand, the transmission 18 (gearwheels 18A, 18B, 18C) causes the shaft 5 to rotate about the axis 11, against the torsion spring 6A. As a result, because of the offset between the axes 10 and 11, corresponding respectively to those of the cam 4 and of the shaft 5 in the clevis 12, the contact surface 4A of the said cam during this limited angular movement moves away from the bearing face 8 of the fitting by a distance D along the normal to the plane of the bearing face 8 of the fitting. The cam 4, under the action of its torsional return spring 6A, tends to oppose the direction of rotation imposed to engage naturally still further (that is to say to lock towards the bearing face), but the rotation of the shaft 5 opposes this and continues so that through the engagement of the driving finger 7 coming into contact with the end 4D of the slot through the rotation of the shaft 5, the cam 4 becomes disengaged from the bearing plane 8 of the fitting before the finger 19B reaches the end of its travel against the rounded end 14D of the slot 14B. The cam moving away by a distance D thus makes it possible, at low torque and through the offset of the axes, rapidly to eliminate the internal forces which are the root cause of jamming of the system, when it is vigorously locked. In addition, it is contrived for the reaction to the force of the bearing face 8 on the contact surface 4A of the cam to pass substantially to the axes 10 and 11 (give or take the scatter on the angle of friction), so that the force to be supplied by the motor is very small.

At this instant, as FIG. 10 shows, the cam 4 has pivoted through approximately 45°, while the element 3 is still aligned, the finger 19B coming into contact with the rounded end of the slot 14B. The rotation imparted by the motor 9, the radial link 19 and the transmission 18 continues in the direction of rotation indicated by the arrows and simultaneously causes the folding-up of the element 3 about the axis of articulation 17 and the retraction of the cam 4, as indicated in FIG. 11 which is similar to FIG. 1.

The system 1 then regains its initial position illustrated in FIG. 4 for which the two elements are in the stacked, unlocked, position.

I claim:

1. System for unfolding or folding up a first and a second element into an unfolded or a folded position, wherein said first and second elements are linked in rotation one with respect to the other about an axis of articulation and wherein said system is for locking or unlocking said first and second elements at least in the unfolded position, said system including:

a cam (4), rotatably connected to the first element (2) and having a contact surface (4A) in the shape of logarithmic spiral having an origin;

a flat bearing face (8) provided on the second element (3) and against which said contact surface (4A) of the cam can press;

a shaft (5), rotatably connecting said cam to said first element on which the cam can turn about a first axis (10) containing the origin of the spiral, and wherein said shaft is mounted so that it can also rotate with respect to said first element about a second axis (11) which is offset parallel to said first axis (10) of rotation of the cam;

elastic means (6) tending to make said cam turn in a first direction such that said contact surface (4A) of the cam moves towards said beating face;

a finger (7), integral in terms of rotation with said shaft and capable of driving said cam in a second direction, opposite the first direction; and drive means (9) for driving the said shaft in rotation, wherein said drive means (9) are motorized and also drive said rotation of the first and second elements one with respect to the other about said axis of articulation, and wherein said drive means comprise:

a motor (9A), having an axis of rotation (17) which is parallel to the first and second axes of rotation (10, 11) of the cam, said axis of rotation (17) corresponding to said axis of articulation;

a transmission (18) linking said motor to said shaft; and a radial link (19), integral in terms of rotation with said motor and able to drive said second element in rotation about said axis of articulation.

2. System according to claim 1, wherein said transmission (18) linking the motor to the shaft is composed of a plurality of coplanar gearwheels, a gearwheel (18A) integral in terms of rotation with the said motor (9A), a gearwheel (18C) integral with the said shaft (5) and an intermediate gearwheel (18B) linking said gearwheel 18(A) of the motor and said gearwheel (18C) of the shaft so that a direction of rotation of the second element and a direction of rotation of the cam, are identical.

3. System according to claim 2, wherein said motor (9A) and said intermediate gearwheel (18B) are linked to said first element.

4. System according to claim 1, wherein said radial link (19) linking said motor to said second element is defined by a radial arm (19A) having a fixed end integral with said motor and having a free end (19B) opposite said fixed end which engages in a curved slot (14B) formed in the second element.

5. System according to claim 4, wherein said curved slot (14B) of the second element covers an angle of approximately 90°.

6. System according to claim 1, wherein said finger (7), integral in terms of rotation with said shaft, projects from said shaft into a curved slot (4C) formed in said cam.

7. System according to claim 1, wherein said elastic means (6) consists of a prestressed torsion spring (6A) mounted around said shaft (5) and linked to said cam (4) and to said first element (2).

8. System according to claim 1, wherein stop means (15) are provided to mark said unfolded and said folded-up positions of said second element (3) with respect to the said first element (2).

9. System according to claim 8, wherein said stop means (15) are defined by contact faces (14A, 14F) provided on the second element, and able to press against corresponding faces (16A, 16B) provided on the first element.

* * * * *